Jan. 8, 1963     R. C. WILLIAMS     3,072,896

LOW OIL LEVEL INDICATOR FOR SEALED JOURNAL BEARING

Filed Oct. 16, 1958     2 Sheets-Sheet 1

INVENTOR:
RAY C. WILLIAMS
BY Harvey M. Gillespie
ATT'Y

Jan. 8, 1963 R. C. WILLIAMS 3,072,896
LOW OIL LEVEL INDICATOR FOR SEALED JOURNAL BEARING
Filed Oct. 16, 1958 2 Sheets-Sheet 2

INVENTOR:
RAY C. WILLIAMS
BY
*Harvey M. Gillespie*
ATT'Y

United States Patent Office 3,072,896
Patented Jan. 8, 1963

3,072,896
LOW OIL LEVEL INDICATOR FOR SEALED JOURNAL BEARING
Ray C. Williams, Chicago, Ill., assignor to Standard Car Truck Company, Chicago, Ill., a corporation of New Jersey
Filed Oct. 16, 1958, Ser. No. 767,545
3 Claims. (Cl. 340—270)

The improved automatic low oil level indicator comprising the present invention has been designed for use primarily in connection with sealed journal bearings for railway car axles of the general class in which a combination bearing and lubricant reservoir enclose the journal and thereby renders visual inspection thereof impractical. One such journal bearing is shown herein and comprises a sectional metallic casing including an upper section and a lower section which, when the two sections are secured together, provide an enclosure for the axle journal. The upper section is positioned above the axle journal and is interlocked with a housing which forms a part of the car truck side frame. The lower section constitutes a reservoir containing a body of lubricant for application to the journal either by direct contact therewith or by a suitable transfer mechanism. A thin liner of babbitt or other bearing metal is removably attached to the upper section of the casing and has direct bearing contact with the journal. When employed with journal bearings of this type, the present indicator is adapted to render a visual signal at such time as the level of the lubricant within the reservoir falls below a predetermined minimum so that an inspector or other trainman may become apprized of the condition and remedy the same by adding fresh lubricant to the reservoir. The invention is however capable of other uses and the present indicating system may, if desired, with or without modification, be employed in the rendering of a visual signal to indicate the presence of a shortage of liquid in a container, regardless of the nature of the liquid or of the container in which it is enclosed. Irrespective however of the particular use to which the present invention may be put, the essential features thereof are at all times preserved.

It is among the principal objects of the present invention to provide a signalling system designed for use in rendering a visual signal when the oil level within a journal box structure of the character briefly outlined above becomes dangerously low and which is predicated upon the use of a pair of float-controlled electrical contacts adapted to become closed when the float associated with the system moves to a predetermined position under the influence of a decrease in the level of the lubricant to thus establish or energize an electrical circuit through a signalling device whereupon the latter will render the desired visual signal, the signal remaining visible until such time as the circuit is broken by a rise in level of the float upon the application of fresh lubricant to the journal box reservoir or when the supply of energy has been interrupted.

A more specific object of the invention is to provide an indicating system of this character including a low voltage visual signalling device and a low voltage source of electrical energy for the same in the form of a solar battery, the signalling device and battery being operatively positioned within a small and compact cabinet or case which is operatively mounted in an exposed position on the sectional casing of the journal bearing structure where it is conveniently accessible for routine inspection to ascertain the presence or absence of a sufficient quantity of lubricant within the reservoir.

In reservoir constructions of the character set forth above transfer assemblies are frequently employed for applying lubricant from the body of lubricant contained within the reservoir to the rotating journal. Such transfer assemblies ordinarily are in the form of a series of lubricant transfer rollers appropriately spaced on a common shaft, usually of the floating type, and the entire shaft and roller assembly is spring-pressed upwardly against the underneath side of the rotating journal so that the rollers will derive rotary motion directly from the rotating journal to enable them to pick up oil from the body of lubricant within the reservoir and apply it to the journal by direct contact therewith. When such transfer devices are employed it is not necessary or desirable to maintain a large quantity of the lubricant within the reservoir since it is merely necessary that the rollers bridge the distance between the surface of the liquid and the rotating journal. A small quantity of the lubricant within the reservoir will therefore supply adequate lubricant to the journal for a relatively long period of time but it is important that the level of the lubricant be maintained at least above the lower edges of the rollers at all times. The level of liquid maintained within the reservoir is therefore critical and the difference between a level sufficient to maintain adequate lubrication and a level wherein no lubrication is available is small and it is therefore desirable that at this critical point an indication of the lack of lubricant within the reservoir be promptly given. The present invention supplies this need and toward this end it contemplates the provision of a float member adapted to be freely supported upon the body or pool of liquid within the reservoir and which is of an extremely buoyant nature so that it will respond to small changes in liquid level and not become grounded on the bottom wall of the reservoir before its lowermost operative circuit-closing position has been attained. In order to maintain the float in close proximity to the transfer rollers within the reservoir, the float is hingedly supported on the transfer roller supporting shaft by a relatively short hinge connection which maintains the float close to but out of the path of movement of the various rollers in such a manner that the float will attain its lowermost operative circuit-closing position immediately prior to the time that the level of lubricant would ordinarily fall below the level of the lowermost edges of the various rollers, thus rendering a warning signal at a sufficiently early time before the lubricant in the reservoir has become exhausted. By utilizing the transfer roller supporting shaft as an element of the hinge connection for the float, the float is made a part of the transfer assembly so that it may be readily installed at the time the transfer assembly is itself installed in the reservoir, after which it becomes a permanent part of the transfer mechanism. Still further, in carrying out the invention, the battery employed is preferably of the solar type capable of producing a low voltage electric current when exposed to light rays of predetermined value. The visible energizable signal device which becomes energized upon closure of the float contact, is preferably in the form of a small transparent envelope containing a body of electrolyte of any known base-acid compound containing a color changing indicator therein and adapted to assume a definite color when the ion concentration in the electrolyte is varied under the influence of the passage of an electrical current of low potential therethrough. The passage of a relatively weak current through such electrolyte is sufficient to establish such color indication and therefore the low voltage current supplied by the solar battery is sufficient for this purpose. By utilizing a low voltage source of current in the system, such as may be generated by the previously mentioned solar type battery, makes the system adaptable for use in situations where electrical current of greater potential might promote combustion. However, with the present invention there is little or no possibility of initiating combustion within a lubricant reservoir, either under the influence of a spark across the electrical contacts or due to heat of resistance at any point in the circuit. This is true even when the lubricant within the reservoir is hot. The present invention thus affords safety features which would ordinarily not be present where higher voltage electrical current is concerned.

Numerous other objects and advantages of the invention, not at this time enumerated, will become more readily apparent as the following description ensues.

In the accompanying drawings forming a part of the specification, a preferred embodiment of the invention has been shown.

Figure 1:
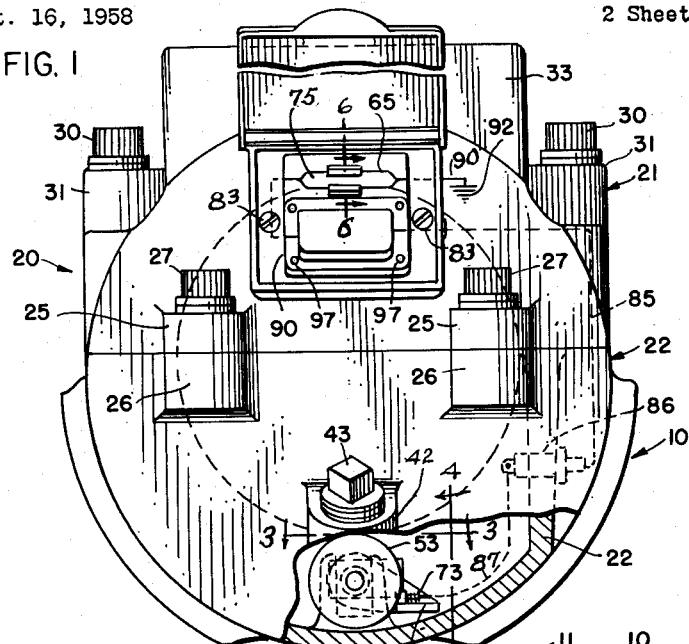
FIG. 1 is an end elevational view of a journal box construction to which the automatic low oil level indicator of the present invention has been operatively applied. In this view a portion of the journal box casing has been broken away to more clearly reveal the nature of the invention.
Figure 2:
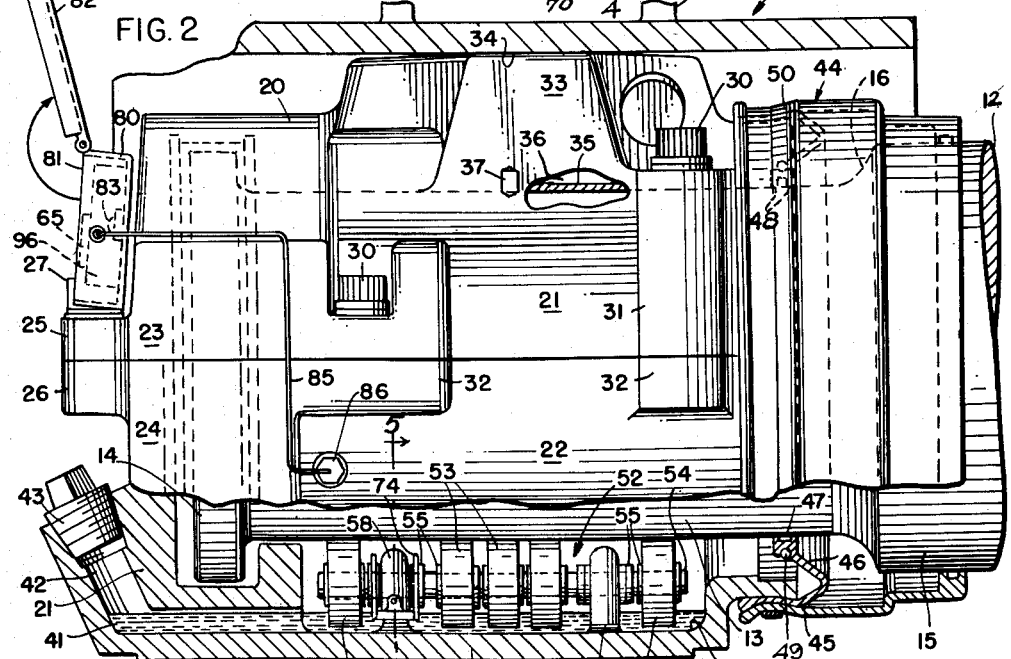
FIG. 2 is a side elevational view, partly in section, of the structure shown in FIG. 1.

Referring now to the drawings in detail and in particular to FIGS. 1 and 2, the invention has been shown as being operatively applied to a journal box structure 10 which is in the form of a generally tubular retaining housing, integrally cast or otherwise formed on the side frame 11 of a railway car truck. The railway car wheel axle 12 extends into the tubular housing 10 and the journal portion 13 of the axle is completely disposed within the cylindrical confines of the housing. The outer end of the axle is formed with the usual thrust collar 14 while the inner end of the journal 13 merges with the usual cylindrical dust guard surface 15 of the axle through a curved shoulder 16. It will be observed therefore that the axle 14 and bearing portion thereof are of conventional design and require no modification thereof for proper cooperation with the journal bearing assembly of the present invention. The retaining housing 10 is adapted to receive and retain therein a sealed journal bearing assembly which has been designated in its entirety at 20. The assembly 20 constitutes the sole means whereby the side frame 11, together with its associated housing 10 are supported on the rotating axle journal 13. The retaining housing 10 occupies the position which ordinarily is occupied by the conventional journal box construction and for which it has been substituted to accommodate the sealed bearing assembly 20 to which the present signalling indicating system has been applied.

Still referring to FIGS. 1 and 2, the bearing assembly 20 is comprised of a two-part separable casing of metal or other suitable material which encompasses and conceals from view the journal 13 and its associated structure. The assembly 20 includes an upper section 21 and a lower section 22. The two sections 21 and 22 are each of generally semi-cylindrical configuration and the upper section 21 is formed with a generally radially extending outer wall 23 which cooperates with a similar radial outer wall 24 formed on the lower section 22 to define an end wall closure for the casing when the two sections are assembled upon each other. The upper and lower sections 21 and 22 of the composite bearing casing are provided with pairs of cooperating ears 25 and 26 respectively through which clamping bolts 27 extend for retaining the two sections in their assembled relationship. A plurality of clamping bolts 30 project downwardly through ears 31 on opposite sides of the section and are threadedly received in registering ears 32 to further retain the two sections in their assembled relationship.

The upper section 21 of the bearing assembly is provided with a medial thickened portion 33 which, as shown in FIG. 2, is generally of X-shaped horizontal cross section, which is to say the thickened portion 33 is comprised of two intersecting ribs on the upper section of the casing. The thus thickened section of the casing, in effect, constitutes the bearing "wedge" ordinarily associated with railway car journals and the upper surfaces of the ribs afforded by this thickened section are adapted to bear directly against the flat underneath surface 34 of the bearing housing 10 whereby the housing and its integrally formed side frame 11 are supported on the upper section of the composite bearing casing. A curved liner 35 of bearing material rests on the top of the journal 13 and underlies the semi-cylindrical surface 36 of the upper section 21 of the casing. It is anchored to the section 21 against rotational movement by a stud 37 and is coextensive with a major longitudinal extent of the journal 13.

The lower portion of the casing section 22 is provided with a shallow well 40 adapted to receive therein a supply in the form of a shallow pool 41 of the lubricant. The well 40 communicates with a filling opening 42 adapted to be closed by a threaded plug 43. At the rear end of the lubricant reservoir 40 a lip seal assembly 44 serves to prevent egress of the lubricant from the casing. The assembly 44 includes a lip seal proper in the form of a flexible ring 45 of elastomeric material which is preferably formed of synthetic rubber and is impervious to the deleterious action of hydrocarbon oils. The ring 45 is provided with an inwardly extending-apron portion 46, the inner edge of which is grooved as at 47 to provide a pair of thin sealing lips 48 which are adapted to closely hug and bear against the journal 13 adjacent the rear end thereof. A garter spring 49 surrounds the re-entrant apron portion 46 and applies sealing pressure to the same. The forward end of the sealing ring 45 surrounds the rear rim portion of the composite casing and is held thereon by means of a sleeve 50 which is telescopically received over the ring 45.

Referring now to FIGS. 2 to 5 inclusive, the lower section 22 of the composite bearing casing supports at its bottom region a lubricant transfer assembly designated in its entirety at 52, the assembly consisting of a series of lubricant transfer rollers 53 appropriately spaced on a common floating supporting shaft 54. In the present instance five such rollers 53 have been shown as being mounted on the shaft 54 but it will be understood that a greater or lesser number of such rollers may be employed if desired. The rollers 53 are maintained in their spaced relationship along the shaft 54 by means of collars 55 and the rollers are individually freely rotatable on the shaft. The shaft 54 is carried in a pair of spaced vertically movable guide blocks 56 which is vertically slidable in opposed guideways 57 provided in an upstanding bifurcated boss-like protuberance 58 which extends upwardly in the reservoir 40 from the bottom wall 59 of the latter. A spring 60 which is centered in a socket 61 provided centrally in each boss 58 normally urges its respective guide block 56 upwardly within the guideways 57 so that the various lubricant transfer rollers 53 carried on the shaft 54 are yieldingly urged into engagement with the underneath surface of the rotating journal 13. The rollers 53 are preferably formed of relatively compact felt or other fabric material in order that they may effect their lubricant transfer action more expeditiously inasmuch as the interstices of the fabric material will attract the lubricant by capillary action. The arrangement of parts thus far described forms no part of the present invention and no claim is made herein to any novelty associated with the same, the novelty of the present invention residing rather in the construction of the automatic low oil level indicating mechanism by means of which a visual signal is rendered externally of the sealed journal bearing assembly when the oil 41 in the reservoir 40 thereof has been substantially exhausted and falls to a level below a predetermined minimum as will now be more fully described.

Figure 7:
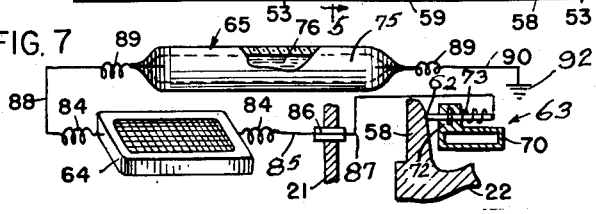
FIG. 7 is a schematic view and circuit diagram of the electrical components of the present invention.

As schematically illustrated in the circuit diagram of FIG. 7, briefly, the automatic low oil level indicator of the present invention comprises an electrical signal system utilizing three electrical components, namely a pair of electrical contacts 62 operable under the control of a float assembly 63, a source of electrical energy 64, and a visual signal device proper 65, the three components 62, 64, and 65 being operatively connected in series relationship in an electrical circuit which extends from a point on the casing section 22 through the contacts 62, source 64 and signal device 65 in the order named to a point on the casing section 21 which is effectively grounded to the casing section 22. The contacts 62 are adapted to remain open at such times as there is an adequate supply of lubricant 41 within the reservoir 40 and to become closed under the influence of the float assembly 62 whenever the level of lubricant in the reservoir falls below a predetermined minimum, thus energizing the electrical circuit and consequently the signal device 65 whereupon the desired visual signal is given.

Figure 3:
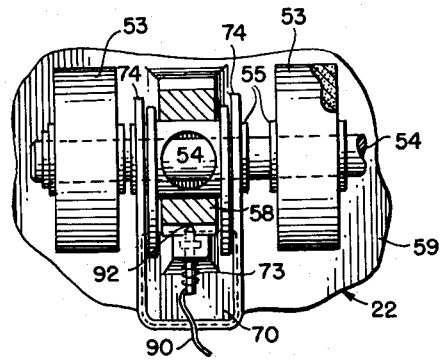
FIG. 3 is an enlarged sectional view taken substantially along the line 3—3 of FIG. 1.
Figure 4:
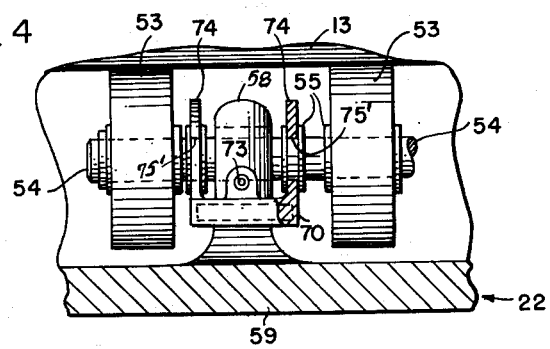
FIG. 4 is an enlarged sectional view taken substantially along the line 4—4 of FIG. 1.
Figure 5:
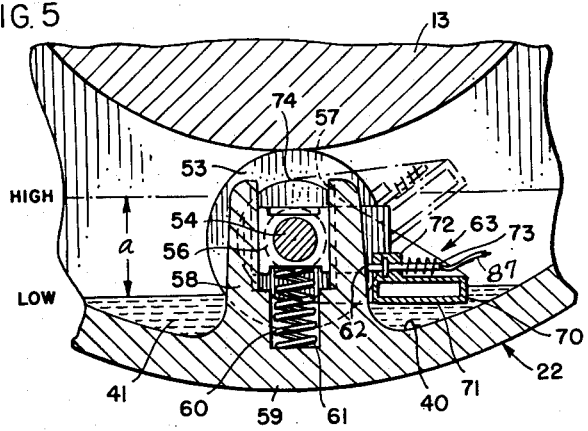
FIG. 5 is an enlarged sectional view taken substantially along the line 5—5 of FIG. 2.

The details of the float assembly 63 are best illustrated in FIGS. 3 and 5. This assembly comprises a float proper made preferably of non-electrical conductive material and in the form of a relatively flat, buoyant body portion 70 having a fairly expansive bottom face 71 and from the top face of which there projects upwardly a thickened portion or boss 72 through which there extends a contact pin 73 which projects to make contact with the boss-like protuberance 58 when the float assembly 63 is in its lowermost position. The float 70 has formed at the opposite ends thereof a pair of generally laterally and upwardly inclined arms 74 (FIGS. 3, 4 and 5) which are provided with aligned openings 75' therethrough and through which openings the shaft 54 extends, whereby the proximate ends of the arms 74 are pivotally connected to the shaft 54 while the distal ends of the arms serve to support therebetween the float 70. The bottom face 71 of the float 70 is adapted to rest and be buoyantly supported on the upper surface of the pool of lubricant 41 contained within the reservoir 40 so that the float is movable from the full line lowered position wherein it is shown in FIG. 5 with the pointed end of the contact pin 73 engaging the side of the protuberance 58, to the elevated dotted line position wherein the pointed end of the contact pin 73 moves away from the side of the protuberance 58. The float 70 will assume its extreme lowermost position when the level of lubricant within the reservoir is dangerously low and it will assume its elevated position when the lubricant within the reservoir has been fully replenished.

The source 64 of electrical energy is preferably in the form of a solar battery of the type which is adapted to become charged upon exposure thereof to the actinic rays of the sun or other light source and which, when fully charged is capable of delivering a low voltage current.

The visual element or signal device 65 is in the form of a glass or other transparent tube or bulb 75, sealed at its ends and containing a body 76 of electrolyte, of any known base-acid compound, the ion concentration of which is altered, in known manner, when an electrical current is passed therethrough. The said electrolyte also contains a color indicating medium which becomes effective to change the color of the electrolyte during the passing of electrical current therethrough. While several such color indicating media are known, it has been found that an electrolyte containing a quantity of phenolphthalein, as a color changing medium, is particularly well adapted for use in the special environment hereinabove illustrated, since the electrolyte in such case will normally remain colorless, but will assume a relatively deep magenta color or hue when its ion concentration is altered by the passing of an electric current therethrough. Such condition will be produced in the proper electrolyte (preferably a weak acid and base) when a very small electrical current is applied thereto. Such electrolyte compound will also automatically revert to its original colorless appearance upon the interruption of the electrolysis action and consequently the color changing phenomenon will quickly disappear.

The solar battery 64 and the visual indicator 65 are removably disposed within an opaque and relatively shallow box-like casing 80 having an open front 81 adapted to be normally closed by a hinged lid 82. Consequently the solar battery is exposed to light rays only when the lid 82 is open. The casing 80 is secured by means of fastening screws 83 to the front wall of the casing section 21 where it is readily accessible to an inspector or other trainman who, by the simple expedient of raising the lid 82 may ascertain the energized or de-energized condition of the visual signal device 65.

The solar battery 64 is provided with the usual terminals 84, one of which terminals may be soldered or otherwise electrically connected by means of a lead wire 85 to a separable jack 86 on the wall of the casing 22. The jack is connected to a second wire 87 leading to the contact pin 73 associated with the float assembly 63. The bulb 75 has two terminals 89, 89 which are sealed through opposite ends of the tube and serve as electrodes in contact with the liquid 76. The other terminal 84 of the battery 64 is connected by means of a lead wire 88 to one of the two terminals 89 of the bulb 75 and the other terminal 89 of the bulb 75 is connected by means of a lead wire 90 to a contact point 92 on the casing section 21.

Figure 6:
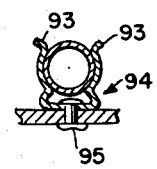
FIG. 6 is an enlarged sectional view taken substantially along the line 6—6 of FIG. 1.

As best seen in FIGS. 1, 2 and 6, the glass bulb 75 of the visual indicator device 65 is releasably retained between the two arms 93 of a spring clip 94 secured by a rivet 95 to the inside of the back wall of the box-like casing 80 where the bulb 75 is conveniently accessible for removal and replacement purposes, it being merely necessary to unsolder and resolder the connections at the terminals 89. The solar battery 64 is removably disposed within a recessed holder 96 which is fastened by screws 97 to the back wall of the casing 80. The battery 64 is thus similarly replaceable by soldering operations. The detachable or separable jack 86 is provided so that the reservoir section 22 may be removed or replaced in the journal assembly without necessitating cutting or otherwise severing of the electrical connections leading to the float assembly 63.

The invention is not to be limited to the exact arrangement of parts shown in the accompanying drawings or described in the specification since various changes in the details of construction may be resorted to without departing from the spirit of the invention. Only insofar as the invention has particularly been pointed out in the accompanying claims is the same to be limited.

I claim:

1. In combination with an axle journal of a railway car enclosed within a sealed opaque housing containing a body of lubricant having a variable level and located beneath said journal for application thereto, of means for rendering a visual color signal when the level of lubricant stands below a predetermined minimum comprising a sealed transparent envelope containing a body of electrolyte of low electrical resistance containing a reversible color changing indicator and upon being electrolyzed alters its ion concentration sufficiently to react with said indicator to promote, in the electrolyte, a color change phenomenon which persists only during the electrolysis, means comprising a solar battery connected in circuit with said body of electrolyte and effective when exposed to actinic rays of light of predetermined value to generate and pass a low voltage electric current through said body of electrolyte to promote said electrolysis, and means for opening and closing the electrical circuit through said electrolyte comprising a float controlled switch operable to open said electric circuit when the level of said lubricant rises above a predetermined minimum and to close said electric circuit when the level of said lubricant falls below said predetermined minimum.

2. An electro-chemical visual indicator adapted to be electrically energized by exposure to actinic rays of light of predetermined value and comprising, in combination, a sealed transparent envelope containing a body of electrolyte of low electrical resistance containing a reversible color changing chemical indicator and which upon being electrolyzed alters its ion concentration sufficiently to react with the chemical color indicator to promote, in the electrolyte, a color change phenomenon which persists only during the electrolysis, and a solar battery connected in circuit with said body of electrolyte and effective, when exposed to said actinic rays of light to generate and pass a low voltage electric current through said body of electrolyte.

3. The combination set forth in claim 2 wherein the body of electrolyte is a colorless liquid compound containing phenolphthalein adapted by reaction with said altered ion concentration to produce in the electrolyte a color having a magenta hue.

References Cited in the file of this patent

UNITED STATES PATENTS

| | | |
|---|---|---|
| 925,064 | Whitney | June 15, 1909 |
| 997,230 | Bendt | July 4, 1911 |
| 1,026,518 | Knobloch | May 14, 1912 |
| 1,068,774 | Hutchison | July 29, 1913 |
| 1,221,812 | McMurray | Apr. 3, 1917 |
| 1,421,717 | Renda | July 4, 1922 |
| 2,089,830 | Grondahl | Aug. 10, 1937 |
| 2,714,715 | Manier | Aug. 2, 1955 |
| 2,910,647 | Kreitsek | Oct. 27, 1959 |